(No Model.)

W. A. PINKNEY.
POTATO DIGGER.

No. 414,656. Patented Nov. 5, 1889.

WITNESSES
Villette Anderson,
Mary Pinkney.

INVENTOR
W. A. Pinkney
by E. W. Anderson,
Attorney

UNITED STATES PATENT OFFICE.

WILLIAM A. PINKNEY, OF STANTON, MICHIGAN, ASSIGNOR OF ONE-HALF TO FRANKLIN H. FRENCH, OF SAME PLACE.

POTATO-DIGGER.

SPECIFICATION forming part of Letters Patent No. 414,656, dated November 5, 1889.

Application filed January 28, 1889. Serial No. 297,850. (No model.)

*To all whom it may concern:*

Be it known that I, WILLIAM A. PINKNEY, a citizen of the United States, and a resident of Stanton, in the county of Montcalm and State of Michigan, have invented certain new and useful Improvements in Potato-Diggers; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
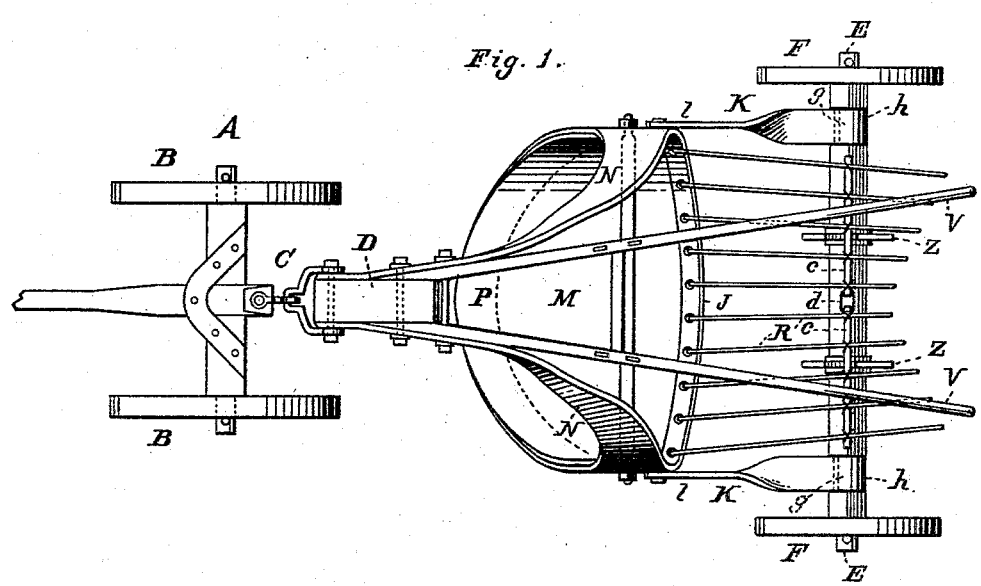
Figure 2:
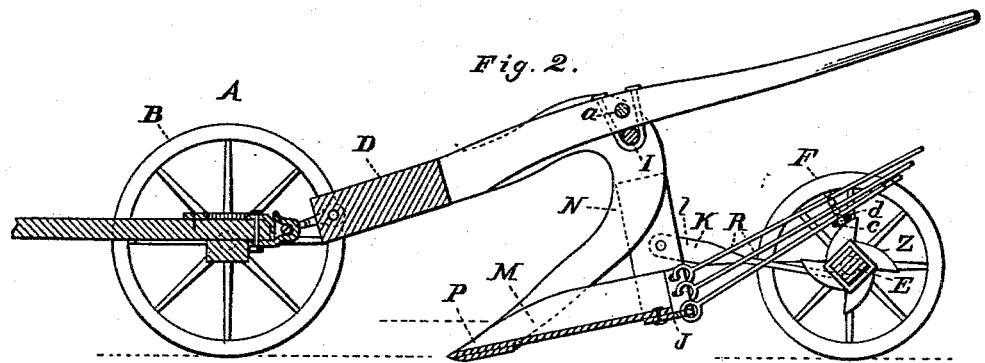

Figure 1 of the drawings is a representation of this invention and is a top view. Fig. 2 is a vertical section taken lengthwise.

This invention has relation to wheel potato-diggers; and it consists in the construction and novel combination of parts, all as hereinafter set forth.

In the accompanying drawings, the letter A designates the front-wheel truck having the wheels B B and the coupling C, whereby it is connected to the head-block D of the rear portion of the machine.

E represents the rear axle, to which the wheels F F are rigidly secured, said axle having the journal portions $g$ $g$ next the wheels to receive the eyes $h$ $h$ of the arms K K, the front ends $l$ of which are pivoted to the sides of the shovel M. The axle turns in the eyes $h$ $h$.

The shovel is broad and scoop-shaped, its curvature being shallow between the side arms N, which extend in curved form upward, forward, and inward, as shown, and are secured at their front ends to the head-block D, which is over and in advance somewhat of the convex forward edge P of the shovel. As the shovel is normally inclined downward, the position of the head-block and its coupling-connection to the front truck is such that said shovel is pulled downward or into the hills under the draft.

Handles V V are connected to the side arms of the shovel, and, extending back, are braced, as at $a$, and are secured to the transverse brace I, which extends from one side arm to the other above the scoop portion. The handles extend to the rear of the axle E.

J represents the rear edge brace or arming of the shovel, which is provided with a series of perforations to engage loosely the eyes of the raddle-rods or sieve-rods R, which extend rearward over the axle E, terminating in rear thereof. The shakers S S are composed of said raddle-rods R, which are connected by bars $c$ $c$, which extend transversely under said raddle-rods and are secured thereto by wire or other proper fastening. There are therefore two shakers, which, although independent of each other, are connected by a middle link $d$, so that the interval between the inner or middle raddle-rods is not wider than the intervals between the raddle-rods of the sections. The inner raddle-rods are shorter than those next thereto on the outer side thereof, these increasing in length gradually, so that the rear edge of the entire shaker composed of the two sections is V form. The transverse bars $c$ $c$, to which are connected the rods R, serve to support said rods and to keep them in proper relative position, and they also serve, being situated just above the axle E, to receive the action of the ratchet-strikers Z, which are secured on said axle. These striking-ratchets are preferably of plate form, and are usually made with square bearing-apertures, whereby they are seated on the squared middle portion of the axle E.

When the machine is drawn forward, the front wheels pass on each side of the hills and steady the shovel, and for more efficient action in this regard the front wheels are set about the proper distance apart to space the hills, while the rear wheels are placed farther apart, as indicated. The shovel entering the hill causes the soil and potatoes to pass over the scoop portion thereof to the shakers, when the soil drops through between the raddle-rods, while the potatoes, passing to the rear on the shakers, fall off at the rear ends thereof. In constructing these shakers the bars $c$ $c$ are preferably curved upward at their outer ends, and the rods are so arranged that the shaker will have a shallow concave form, so that the potatoes on each section will tend to fall toward the middle on the shaker, and as the middle rods are the shortest they will be discharged in a line along the middle of the path of the machine and on the top of the soil which has passed through between the raddle-rods.

Having described this invention, what I claim, and desire to secure by Letters Patent, is—

The potato-digger consisting of the scoop-shaped shovel curved upward and forward and converging toward and connected to the coupling-head block, the rear axle connected to said shovel by arms fastened to said shovel and forming bearings for said axle, the series of raddle-rods loosely connected to said shovel and to bars linked together, the ratchet-strikers fitted upon said axle, arms of which act upon said bars and impart a vibratory movement to said raddle-rods, and the handles secured to said coupling-head and to a brace-rod extending across the scoop or shovel and secured to the side arms of said scoop or shovel, substantially as set forth.

In testimony whereof I affix my signature in presence of two witnesses.

WILLIAM A. PINKNEY.

Witnesses:
T. N. STEVENS,
DANIEL B. BROWN.